United States Patent [19] [11] 3,780,229
Main [45] Dec. 18, 1973

[54] IDENTIFICATION OF SIGNALLING LINES BY SCANNING

[75] Inventor: Peter George Main, Seoul, South Korea

[73] Assignee: Sperry Rand Australia, Canderra, Australia

[22] Filed: Mar. 1, 1972

[21] Appl. No.: 230,809

[52] U.S. Cl. ............ 179/18 FF, 178/50, 179/15 A, 179/15 BA

[51] Int. Cl. ............ H04q 3/72

[58] Field of Search ............ 179/18 FF, 15 A, 179/15 BA; 340/413, 183; 178/50

[56] References Cited

UNITED STATES PATENTS

| | | | |
|---|---|---|---|
| 3,366,737 | 1/1968 | Brown | 179/15 BA |
| 3,159,715 | 12/1964 | Abbott | 179/18 FF |
| 3,532,827 | 10/1970 | Ewin | 179/18 FF |
| 3,535,450 | 10/1970 | Vollmeyer | 179/15 BA |
| 3,614,327 | 10/1971 | Low | 179/15 A |
| 2,965,887 | 12/1960 | Yostpille | 178/50 |
| 3,641,273 | 2/1972 | Herold | 179/15 BA |

*Primary Examiner*—Kathleen H. Claffy
*Assistant Examiner*—David L. Stewart
*Attorney*—D. Paul Weaver et al.

[57] ABSTRACT

Automatic detection and location of a change of electrical state occurring on one of a plurality of lines by the use of individual bistable devices connected to the lines, the bistable devices having outputs connected in matrix-form and wherein a discriminating signal is repeatedly applied via a control logic to the outputs of a diminishing fraction of the total number of bistable devices, the control logic responding to a signal from a gate connected to detect the changed state of a bistable device located in the fraction of the total bistable devices next to be searched by the application of the discriminating signal.

6 Claims, 9 Drawing Figures

PATENTED DEC 18 1973 3,780,229

SHEET 1 OF 6

IDENTIFICATION OF SIGNALLING LINES BY SCANNING

Figure 2:
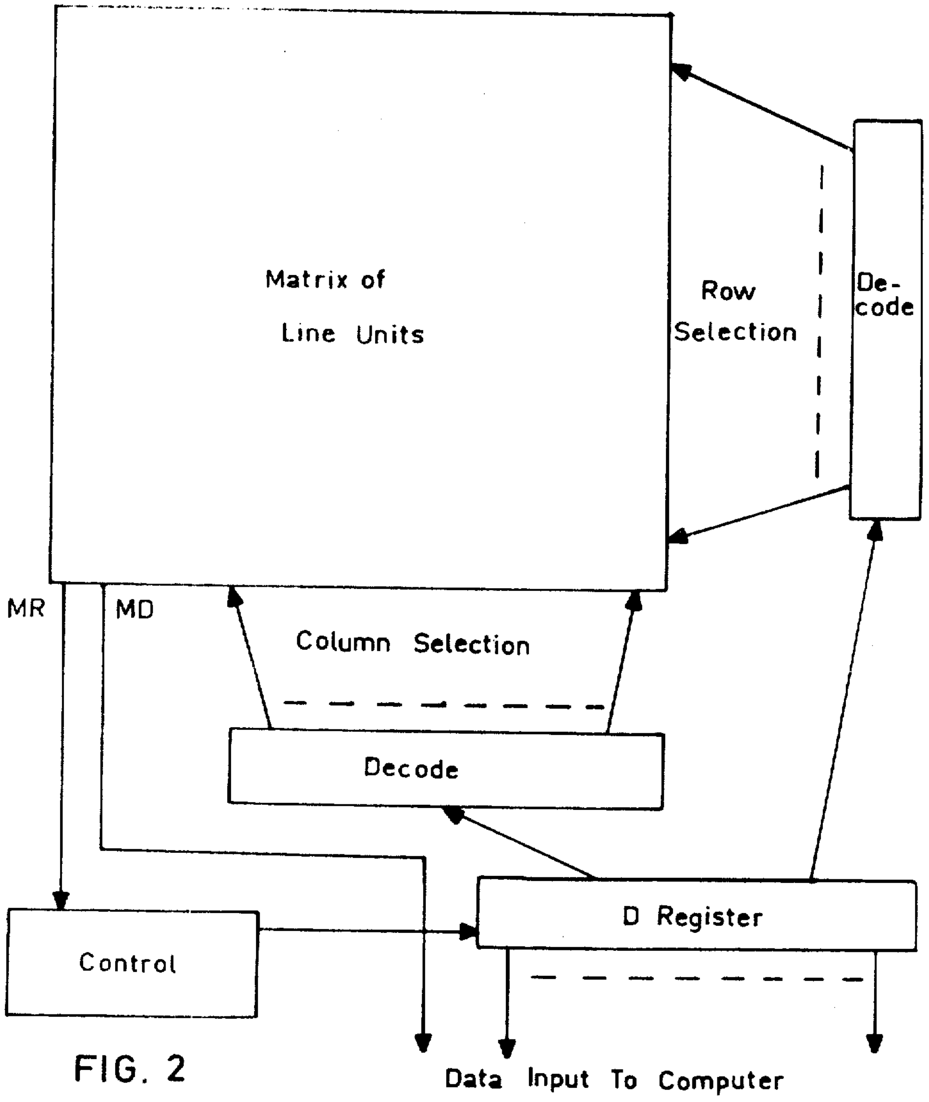

This invention relates to telegraph signalling and more particularly to low speed start-stop signalling. The invention is particularly applicable to systems where a relatively large number of telegraph lines is connected to a dedicated and usually duplicated real-time computer system. One such system is message switching, which typically requires between 30 and 200 lines. Another is real-time enquiry or other transaction-type systems in which there is an economic or other justification for the use of individual low-speed lines to the terminals rather than polled or multiplexed high-speed lines.

In these and similar systems a considerable manipulation of the information is performed on each line and two factors are frequently present:

1. The cost and complexity of low-speed central site communications equipment, particularly when duplication is required for reliability reasons, tends to be a major component of total system cost. This situation is not entirely reasonable in view of the fundamental simplicity and low speed of the communications interface task.

2. The central processor requirements are frequently relatively modest. This is certainly the case in message switching, which places a greater load on communications and mass storage than on hard-core Central Processor Unit (CPU) performance.

The present invention, which provides a method of interfaceing a large number of low speed start-stop telegraph lines to a computer, is the result of a trade-off between these two aspects. Specifically, the comparatively cheap processing power of a computer is used to perform the maximum practical amount of manipulation hitherto performed by the hardware of the communications equipment (e.g. CTM equipment). This results in a reduction in both the cost and the complexity of communications equipment.

The following additional advantages flow from the present invention:

1. A significant improvement in communications equipment reliability follows from the reduction in quantity of equipment involved on a per-line basis.

2. It is economically and technically feasible to design the communications unit with built-in duplication of all common equipment, interfacing in a consistent and logical way with duplicated processors. 3. Certain subsidiary line control functions such as special character recognition, character and/or message parity checking, and detection of abnormal line conditions such as open-line and excessive distortion can be achieved by program rather than by special hardward.

Although the present invention results in an increased demand being made on the CPU, and for this reason may not be suitable for all purposes, provided that the rationale of the method is borne in mind in relation to the CPU and communications requirements of the particular application, the invention has clear advantages in the areas to which it is applicable.

In a typical telegraph system, when a line is not transmitting information, it is in a rest or quiescent first state. The line has a second state. Transmission of information is effected by a signal which lasts for a certain period of time, this period of time being divided into time regions of equal duration, during which regions the state of the line is constant and constitutes a telegraph element. The first region of the time period (i.e., the first element) must be a "start" signal and during this region the line must be in its second state. The state of the line during the second to penultimate regions defines the information being transmitted and in the last region the line must be in the state corresponding to a "stop" signal, indicating the end of the information. This state will obviously be the first state, and the coding of signals must be such as to guard against spurious signals occurring on the line being interpreted as "start" signals and being accredited with being signals containing useful information. One state of the line is generally known as "mark" and the other state as "space," and this terminology will be used in this specification.

With the present invention, conversion between telegraph elements (or bits) and computer characters is carried out in the computer.

In the case of input to the computer, the auxiliary task of synchronisation to the start element of each telegraph character is also performed in the computer. To complicate the problem the input signals are distorted and there are no specific timing relationships between the telegraph signals presented concurrently on the input lines.

In the case of output from the computer, there is no process analogous to synchronisation, and no objection to any convenient timing relationship between concurrently transmitted characters. The only problem associated with output is the necessity to maintain a low distortion figure, but this is not difficult to achieve.

The input task is therefore the more difficult and attention will be concentrated in the following description on the equipment required for input, output being only broadly described.

According to the present invention, a method of interfacing to a computer information transmitted on any one of a plurality of lines, each line having two states, transfer from one said state to the other said state being utilised in the transmission of information, comprises connecting each said line to a respective bistable device, each said device being transferred from one ot its stable states to its other stable state upon the occurrence of a transition of its respective line from one said line state to the other said line state, detecting the presence of a transfer of the state of one of said devices, searching the plurality of devices to ascertain which one has transferred, and causing information indicative of the location of the transferred device and the state of its associated line to be provided to said computer.

Also according to this invention a method of detecting and locating the occurrence of one event at a plurality of like occurrence sites comprises connecting the input of a respective bistable device to each said occurrence site, each said device having an input, an output and first and second external signal terminals, the occurrence of an event at one of said sites causing the device associated with that site to change its state and hence change its output; arranging said devices in a matrix, common connections being made to the first external signal terminals of the devices in respective rows of said matrix, common connections being made to the second external signal terminals of the devices in respective columns of said matrix; and applying a signal to all said first and second external signal terminals, the outputs of said devices being so connected that the change in output signal from a single device causes a change in the output signal from a gate, said change in output signal from said gate initiating a control logic system which varies the application of the signal to said first and second external terminals so that only a fraction of said devices have a signal applied to both their first and second external terminals, whereupon the output from said gate indicates the presence or absence of a device having a changed state in said fraction of devices, said variation of the application of signals being repeated by said logic system with the reduced number of devices having one device therein which has a changed state until the location of the device which has changed state is located.

This invention also encompasses arrangements for performing the above methods.

It is preferable to have the search of the invention in the form of a halving search which will be described later in this specification.

Figure 1:
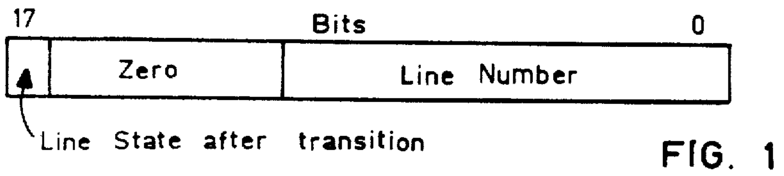
Figure 3:
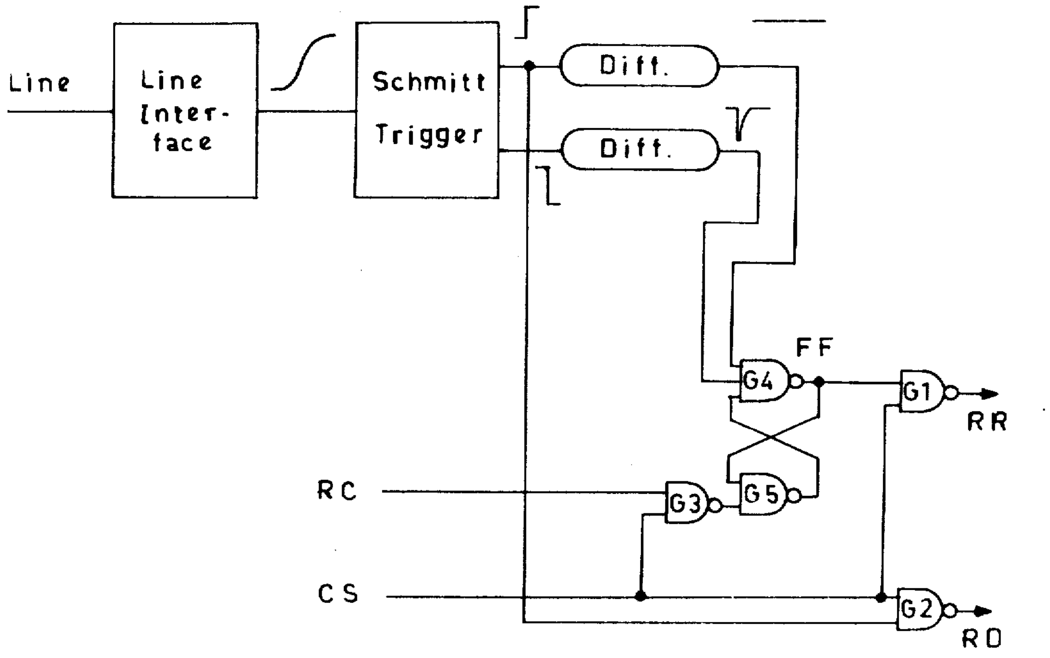
Figure 9:
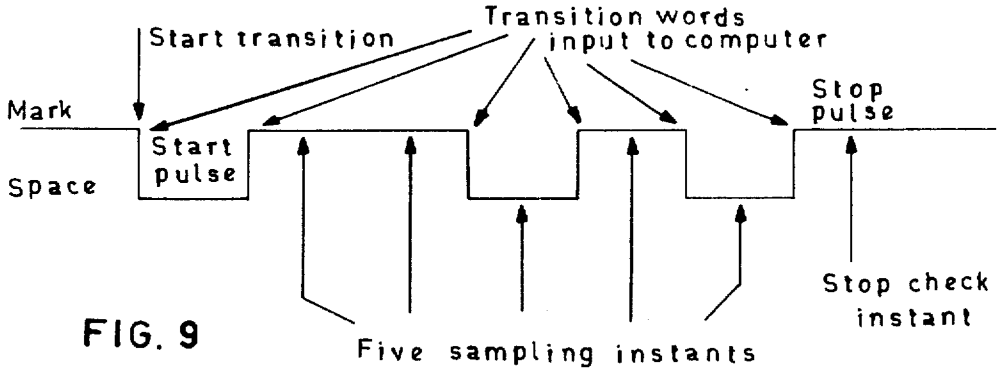
Figure 4:
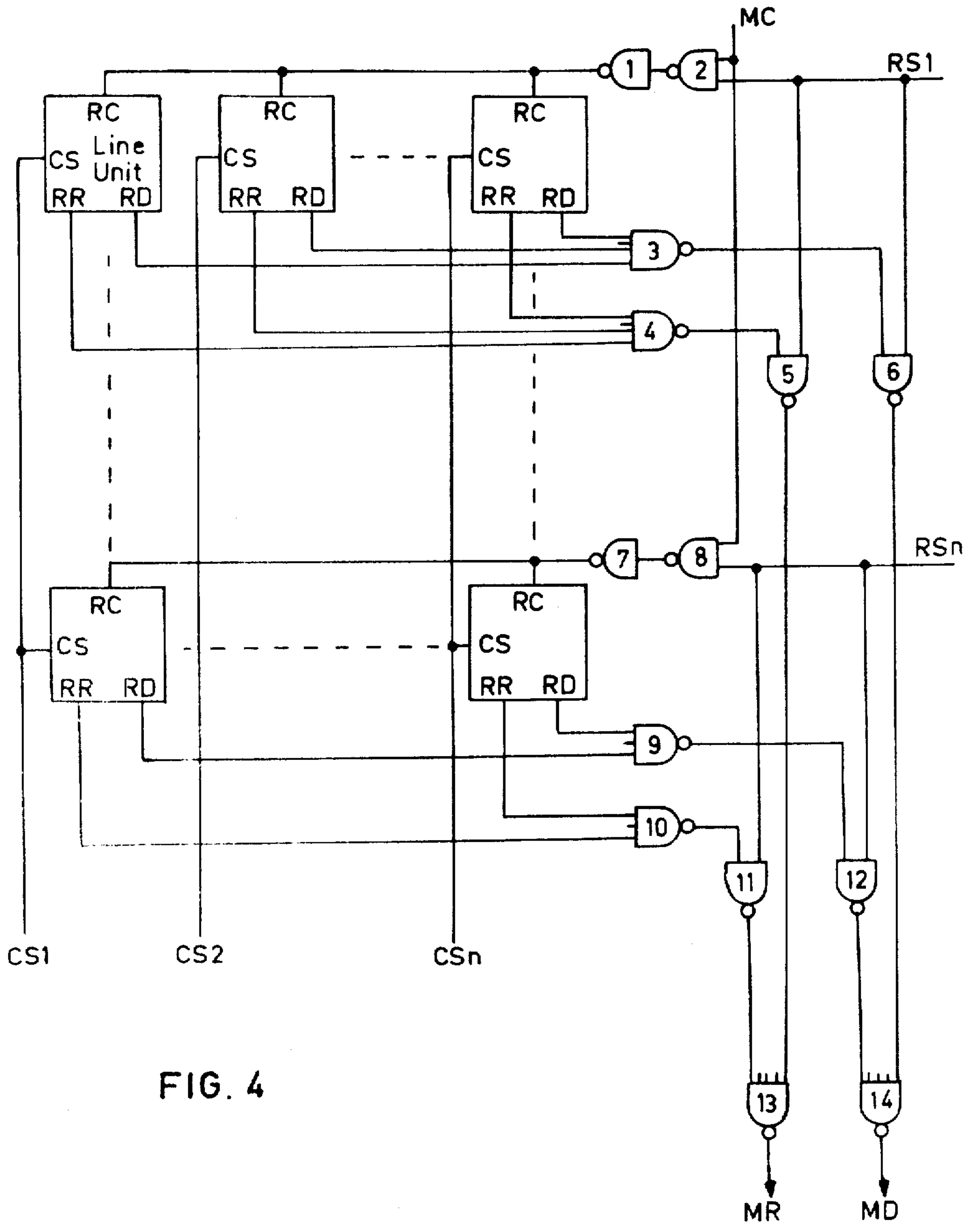
Figure 5:
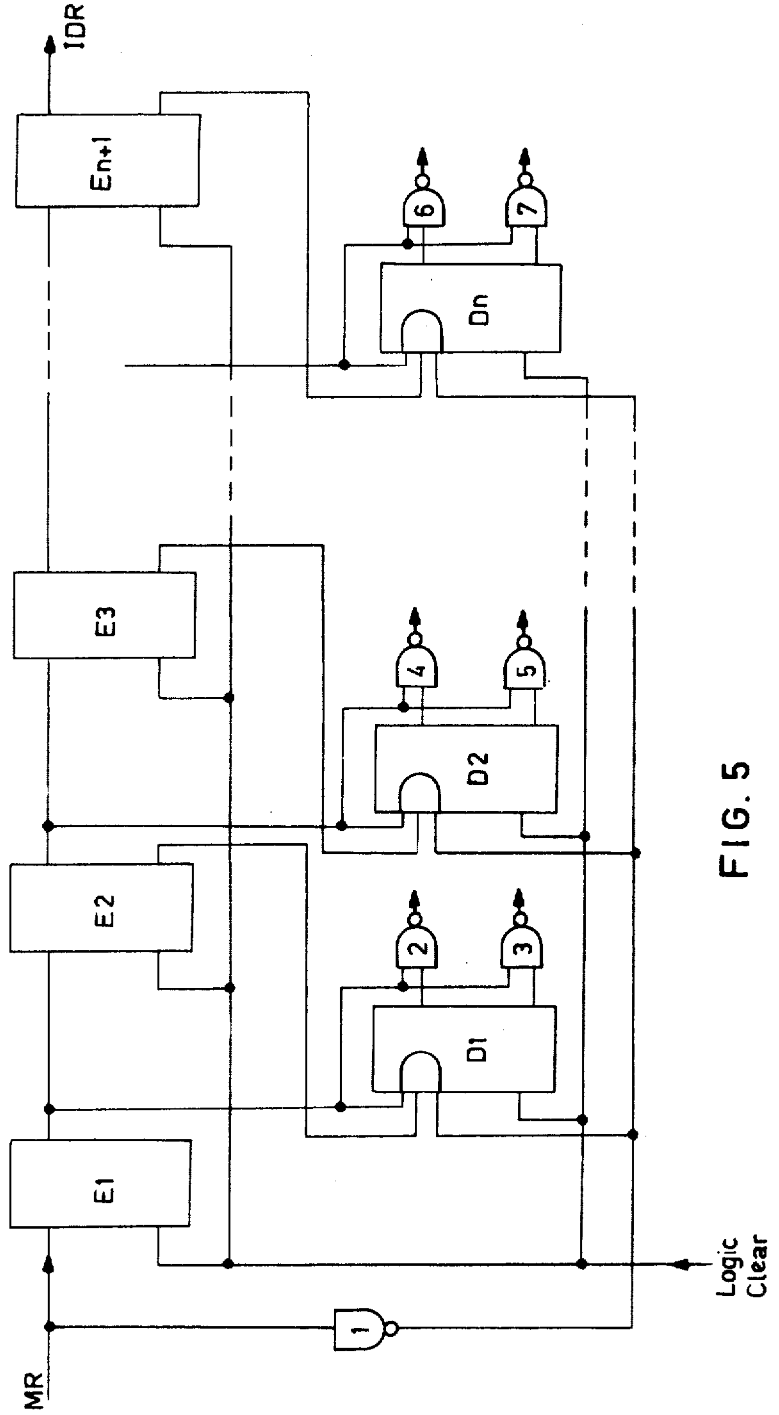
Figure 6:
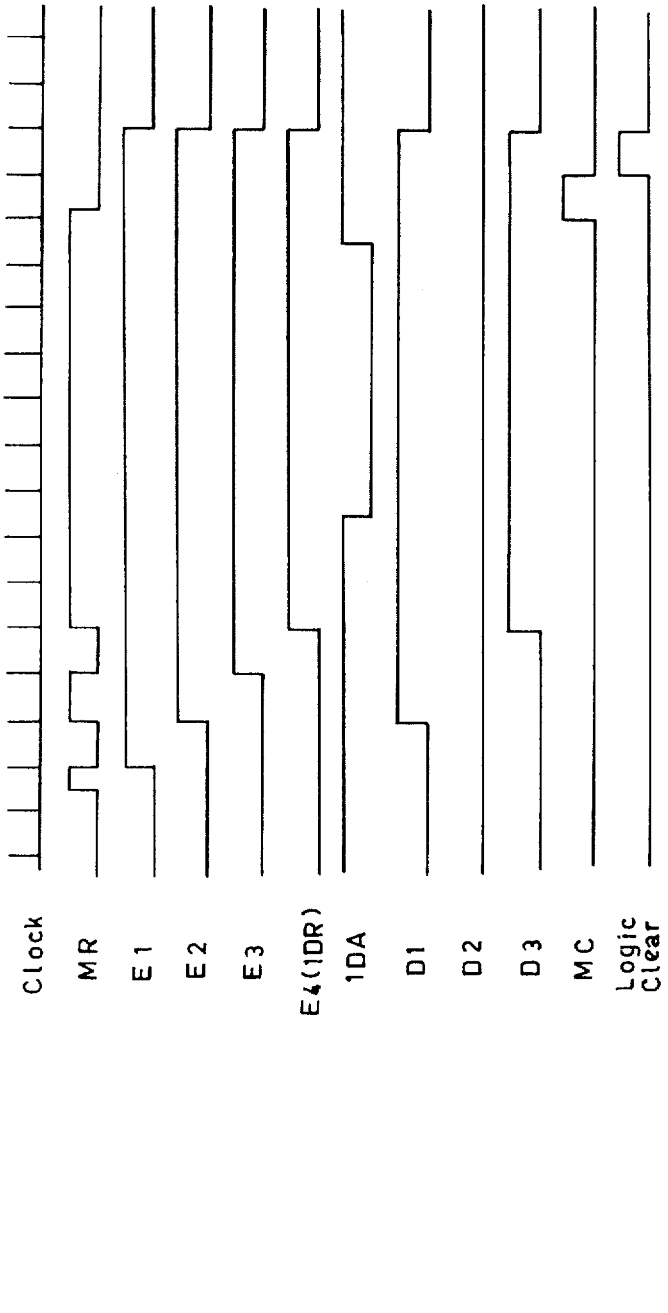
Figure 7:
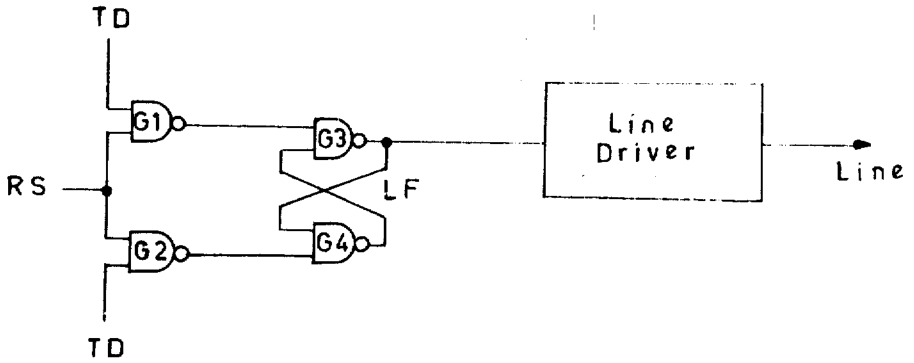
Figure 8:
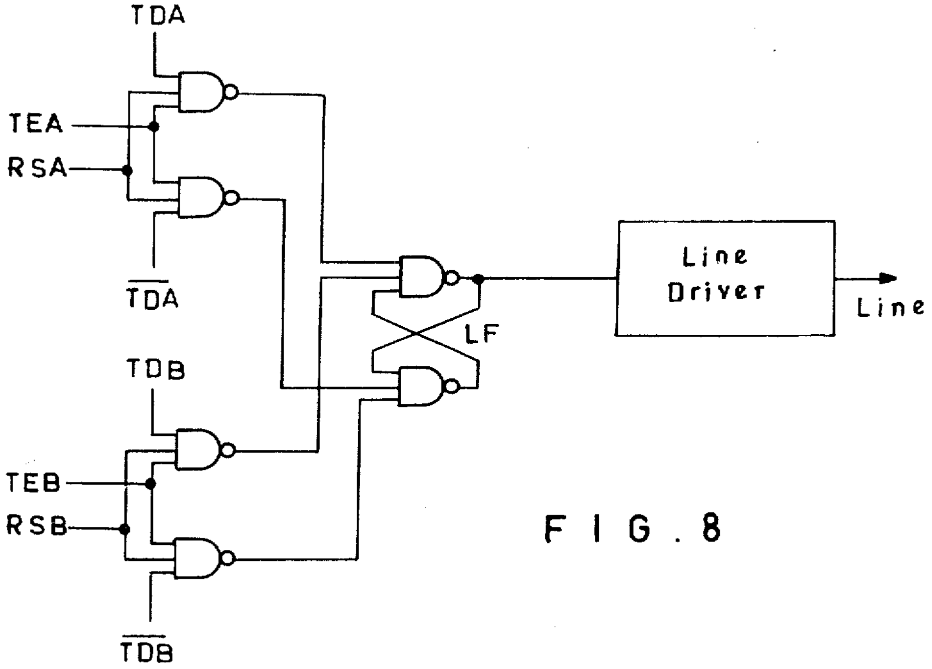

A description will now be given, by way of example only, of an embodiment which includes the present invention, reference being made to the accompanying drawings, in which FIG. 1 shows the format of a transition word which contains all the information relative to a change of state of a line, FIG. 2 illustrates, in block diagram form, the input interface equipment, FIG. 3 shows the construction of a line input unit, FIG. 4 demonstrates an arrangement in matrix form of a number of line units of the type shown in FIG. 3, FIG. 5 illustrates the control logic which accomplishes a halving search and builds up the address of a requesting line unit, FIG. 6 is a timing diagram of a halving search in a simplified embodiment including the present invention, FIG. 7 shows the arrangement used in an output line unit, FIG. 8 illustrates preferred output duplication provisions for the embodiment described, and FIG. 9 is a reconstruction of a telegraph signal with the points at which transition words are transmitted to the computer clearly shown.

Because a UNIVAC 418–111 Computer is particularly suitable for the present invention, and because five unit telegraph signals are common in low-speed start-stop signalling, these will be featured in the following description although neither are essential to the invention which may be implemented with other computers or other types of low-speed stop-start signalling.

It is desirable at this time to define the form in which data is transferred, in the input direction, between the communications equipment and the processor. The definition of this interface implies to a large extent the definition of the hardware and software tasks.

The essential information of a received telegraph signal is contained in the instants at which the state of the line changes from mark to space or vice-versa. This is to say that the information carried by the line can be reconstructed from a knowledge of the times at which these transitions occur. The data transferred to the computer therefore consists of a single computer word for each transition from mark to space, or vice-versa, of each input telegraph line. This 18-bit (in the present case) word contains the address of the telegraph line concerned, right justified in the word, and the state of the line following the transition in the most significant (sign bit) position, a one representing marking and a zero, spacing. This input word format is illustrated in FIG. 1, and will henceforth be referred to as a transition word.

It is generally well known that in practice transitions are to some extent ill-defined, being distorted in both shape and time of occurrence by the characteristics of the line and the inevitable presence of interference. It is the task of the hardware to derive transition instants from the telegraph signal as received. It is necessary to appreciate that these transitions are not recognised at their theoretically correct instants, i.e., that telegraph distoration is present, and it is also necessary to commit a further controlled amount of timing error in the process of transferring this transition data to the computer. Provided that the limitations are borne in mind, this is permissible.

The input to the processor thus consists of a stream of transition words, each representing a transition that has occurred on an individual telegraph line. As such, the essential timing information which must be available to the processor to permit reconstruction of telegraph characters is absent. This timing is included by provision of a clock signal on one telegraph input, in lieu of a telegraph line. This clock signal, derived from an oscillator, provides artificial transition words which effectively partition the input word stream into batches. Time resolution within each batch is not attempted, and consequently the time duration of each batch must be no greater than the permissible timing error which may be committed in respect of any transition. If this timing error is set at one-tenth of a signalling element (implying a clock frequency equal to ten times the baud speed of the lines), the conventional gross start-stop distortion margine of the system is 40 percent which is usually an acceptable figure. Henceforth, this clock rate is assumed.

Summarising at this point, the hardware produces for each transition on each line, an input word to the processor giving the line number and the new state of the line. The resulting stream of words is batched into groups of equal time duration by the inclusion in the stream of periodic time words, recognisable to the program by their being all zero (line number zero).

The means by which this input data stream is generated by the input equipment, and a means by which it may be processed by program within the computer are detailed below, but it is relevant at this point to observe some advantages so far evident:

1. The stream of transition words, carrying all necessary timing information along with the data, requires no critical timing of the computer. In fact, the data stream may be stored and processed at any later time, though there are limitations to the extent to which this may be done in practice.

2. The volume of data transferred to the processor is proportional to activity on the telegraph lines. No data transfers occur (and therefore no processing overhead is involved) for any lines not signalling at any time.

3. Diagnostic software may be used to measure the extent of distortion on the incoming telegraph lines.

We will now consider briefly the output. The broad aim of simplification of communications equipment dictates that the amount of information to be stored in the output equipment should be minimised. On the other hand, however, the timing of telegraph transmission is moderately critical if the necessary low distortion is to be maintained, and it is unwise to rely on the computer to provide this timing. A compromise between these requirements can be reached in the following way.

Each data word transferred from the computer to the output equipment consists of a single telegraph element for each of up to 18 lines. A block of such words, of sufficient size, therefore supplies one element for every output line. A one-word buffer is provided in the output equipment to receive each word, and at the appropriate time (as decided by the output equipment) the contents of this buffer are applied to the lines concerned, and the next word requested from the processor. The transfer of the words of a block from the processor to the buffer, and from the buffer to the lines, is staggered in time over one telegraph element. Start and stop elements are included with data elements by the processor.

Synchronisation of the processor's preparation of output data blocks with the output equipment's use of them is achieved by a periodic interrupt generated by the output control logic. The period of this interrupt is the duration of one telegraph character, and its reception by the processor causes the block of output data requird for the next character-time to be made available in an output buffer.

The interrupt is transmitted to the processor on the input channel, and used (as a by-product) to initiate the input data analysis program as well as the output data program.

The general arrangement of equipment to perform the input function is shown in FIG. 2. Each incoming telegraph line terminates in a Line Unit, which provides the electronic interface to the line and detects the occurrence of signalling transitions on the line. The line units are arranged (conceptually, but not necessarily physically) in a rectangular array or matrix. Each row and each column of this matrix is provided with a selecting wire, and each line unit is enabled to transmit certain data on the common output wires MR and MD by effective coincidence of its row and column selection signals.

The common control logic includes a register, the D register, the contents of which are decoded to provide the row and column selection signals for the matrix of line units. In operation, a searching process is used to build up in the D-register the address of a line unit that has recently recognised the occurrence of a transition on its associated telegraph line. When the search is complete, the D-register contents (which is the address of the telegraph line concerned) is transmitted to the computer together with the state of the telegraph line. This information is transferred to the computer in the format shown in FIG. 1.

FIG. 3 shows the circuit of an input line unit. Positive logic is assumed in the following description.

The unit shown in the figure as Line Interface will consist of whatever circuits are necessary to convert the telegraph line voltage and current into electronic logic levels, and to protect the subsequent circuits from line transients, noise, etc. The details of the circuit will depend on the type (neutral or polar) of the line, the line voltage and current, etc. In practice, a signalling relay will frequently be used for this purpose.

The Schmitt trigger is the unit that effectively makes the decision that a transition from marking to spacing states or vice-versa has occurred. It will produce at its two outputs normal and inverted squared-up versions of the telegraph signal. If a relay is used for the line interface, it is not necessary to include the Schmitt trigger, for the relay can be arranged to perform the same function.

Each output of the Schmitt trigger is differentiated, and the negative-going spikes thus produced used to set the bistable multivibrator, hereinafter called a flip-flop FF, which consists of cross-coupled Nand gates G4 and G5. The positive-going spikes produced by the differentiators are ineffective in the circuit shown in FIG. 3, but this circuit sets FF whenever a transition occurs on the telegraph line, regardless of the direction of the transition. Flip-flop FF therefore indicates, when tested, that a transition has occurred on the line concerned, and as such constitutes a request to the common control logic for transmission of an input transition word to the computer.

The state of FF is sampled by the common control logic placing a logical high on CS ("Column Select"), thus probing gate G1 and transmitting the state of FF onto output RR ("Row Request"). At the same time, gate G2 transmits the state of the telegraph line onto output RD ("Row Data"), and gate G3 is enabled, i.e. arranged to operate in a required manner when a suitable state of its other input exists, thus permitting a subsequent pulse on input RC ("Row Clear") to clear FF when the transition data has been captured for input to the processor.

FIG. 4 shows the general arrangement of interconnection of the individual line unit logical inputs and outputs. In practice the details depend on the number of line units to be catered for, and the fan-in and fan-out capabilities of the logic system used. Conceptually, the line units are arranged in a rectangular matrix. The inputs to the matrix are the CS wires, each one common to all line units in the same column of the matrix, and the RS wires, one for each row of the matrix. There is an additional input, MC ("Matrix Clear"), common to the entire matrix.

A group of six gates is associated with each row of the matrix. These are gates 1 through 6 for the first row shown on the figure, and gates 7 through 12 for the last row shown. Gate 4 provides a logical "or" of the RR outputs of all line units in the row, and gate 5 "ands" this with the RS signal for that row. Similarly, gates 3 and 6 "or" all RD outputs and "and" the result with RS. Gates 1 and 2 provide an RC ("Row Clear") signal to the row of line units from the "and" of MC and RS.

Gates 13 and 14 logically "or" the RR and RD outputs from each row of the matrix to provide MR ("Matrix Request") and MD ("Matrix Data").

By placing a logical high on one CS line and on one RS line, the common control logic to be described can effectively select one line unit only, so that MR reflects the state of FF for that line, and MD reflects the state of that line, marking or spacing. Similarly, by pulsing MC while one CS and one RS line is high, the selected line unit flip-flop FF can be cleared without affecting any other FF in the matrix.

More importantly, however, a group of CS lines (and/or a group of RS lines) can be high at the same time, in which case all line units at the intersection of "high" RS and CS lines are enabled to transmit the state of their FF flip-flops through to MR. In this way, MR indicates whether there is an FF flip-flop in the selected group which is set. Of course, output MD is meaningless in this state, and MC, if pulsed, will clear all FF flip-flops in the selected area of the matrix.

The overall operation of the unit may now be described. In the quiescent state, with no FF flip-flop set anywhere in the matrix of line units, all CS and all RS lines are kept high by common control. As soon as any transition occurs on any telegraph line, MR will go high, indicating that one or more FF flip-flops have set somewhere in the matrix. Common control now proceeds to localise the particular FF set (or the higher priority one, if more than one is set) by a process of halving, analogous to the game of "20 questions". Each step of this process consists of disabling CS/RS selection of half the line units currently selected, and observing whether MR indicates that a requesting (i.e., an FF set) line unit remains in the selected half. If so, that next halving occurs, and if not, the opposite half is selected and the halving continued, until only one FF is enabled, which (of logical necessity) is set.

It will be clear that should more than one FF be set, or should one set while another is being localised, the higher priority line unit may be selected first. The priority sequence is implicit in the order in which the halving process is carried out. It will be shown, however, that for practical numbers of lines and line speeds, the occupancy of the common control search is in the order of 10 percent, i.e., common control spends about 90 percent of time idle, with all CS and RS lines high, waiting for a transition to occur anywhere in the matrix. Application of elementary queuing theory then shows that the incidence of multiple transitions (more than one FF flip-flop set at the same time) is quite low.

The common control logic which accomplishes the halving search process is shown in FIG. 5. It consists of two registers, E and D. The D-register has as many stages as there are bits in the line address field of the computer input word, and the E-register has one more stage. The address of the individual requesting line unit is built up in the D-register during the halving search process, while the E-register controls the process. Note that all flip-flops in FIG. 5 are the clocked J-K type, and all are clocked from the same clock source, which is omitted from the drawing for clarity.

In the quiescent state, registers D and E are both clear (upper outputs logically zero, lower outputs one). With all E flip-flops clear, gates 2 through 7 on the outputs of the D-register flip-flops will be inhibited and their outputs will be high. The outputs of these gates are decoded to form the CS and RS signals shown on FIG. 4. The actual decoding circuits, conventional in form, are not shown on either figure. The E-register is arranged as a shift register, and in operation during the halving search, all stages of the register to the left of a certain point are set, and all stages to the right are clear. Since each E flip-flop enables the output gates of one D flip-flop, at each stage of the halving search (as the contents of the E-register shifts to the right), those D-register stages corresponding to set E-register stages are exercising their selecting function in the line unit matrix, while those stages of the D-register corresponding to clear E-register stages have their output gates inhibited, gate outputs both high, and are not selecting.

Examining the halving search in detail, we start with all D and E register stages clear, and therefore the entire matrix of line units enabled to transmit any requesting line unit FF flip-flop onto MR. MR is low so long as no line unit in the matrix detects a transition, and the equipment remains in this state until a transition occurs.

As soon as one or more transitions occur anywhere in the matrix, MR goes high. At the next clock pulse, E1 sets, initiating the halving search process. The output gates of D1 (gates 2 and 3) are now enabled, the output of gate 3 is low (because D1 is clear), and only half the matrix is enabled — the half corresponding to a zero in the most significant address bit position. Should this half contain a requesting line unit, MR remains high, otherwise MR goes low, indicating that the requesting line unit that triggered the search is in the other (inhibited) half of the matrix. In this case, the steer-set gate of D1 is fully enabled, and the next clock pulse sets D1 to select the correct half of the matrix. This same (second) clock pulse also also sets E2, however, thus enabling only a quarter of the matrix and continuing with the search.

Each clock pulse in the halving search therefore performs two functions:

1. Sets the next stage of the E-register, halving the number of line units currently being "locked at" by the MR line.

2. Sets the most recently enabled stage of the D-register if and only if the appearence of a logical low on MR indicates that this stage must be set to localise a requesting line unit.

The last stage of the E-register, when set, indicates completion of the halving search. At this point, the D-register contains the address the requesting line unit, only that one line unit is selected, and the MD line reflects the state of the selected telegraph line. The input data word for transfer to the processor is now available, so the last E-register stage is used as the processor Input Data Request. The D-register content is transferred to the processor right-justified in the input word, and MD is transferred to the processor in the sign-bit position.

The logic to accomplish control of the processor input is not shown as it is conventional in form. On receipt of the processor Input Data Acknowledge, a pulse is issued on the MC line to clear the requesting line unit FF flip-flop while it is still addressed by the D-register. After this, the D and E-registers are cleared and the unit returns to the quiescent state, unless another line unit is requesting, in which case the halving search recommences.

FIG. 6 shows a timing diagram of the halving search, in the simplified case when the D-register contains three stages, the transverse traces showing the voltage state at the points referenced at the left edge of the Figure, a common time abscissa extending from left to right. This Figure will be readily understood by persons skilled in the art who have read the foregoing description. Ten stages in the halving search would cover a situation where 1,024 lines are used in the system.

An obvious refinement of the technique is the inclusion of a queuing (or buffer) register between the D-register and the processor input. This permits overlap to occur between the search process and input to the processor of the previous word.

There are, on the average, four transitions per five-unit telegraph character — one at the start of the start pulse, and three (average) between select elements.

Consider a 50-baud telegraph line using five-unit code with a 1.5 unit stop element. In a matrix of 1,000 such lines, with a traffic occupancy of 0.5 transitions will occur more-or-less at random throughout the matrix at the average rate of one every 75 micro-seconds.

The time required by the common control logic to serve one transition, neglecting the overlap possible by use of a buffer register, is composed of the time taken by the halving search plus the computer input transfer time. Implementing the logic of the equipment in TTL integrated circuits will permit the clock rate of the search logic to be at least 2 Mc/s. The ten-stage search required to locate a line unit from a matrix of 1,000 will thus require 5 microseconds. Estimating the input transfer time of the UNIVAC 418-111 Computer at 2.5 microseconds gives a total serve time for one transition of 7.5 microseconds, one tenth of the average interarrival time of transitions. The occupancy of the logic therefore 10 percent.

We turn now to a more detailed discussion of output equipment. FIG. 7 shows the circuit of an output line unit. The Line Driver consists of circuits to provide the telegraph line signalling voltage and current, and possibly short-circuit protection. It will usually consist of a signalling relay and associated relay driver.

Flop-flop LF, consisting of cross-coupled NAND gates G3 and G4, controls the line state at all times. LF is loaded by pulsing RS ("Row Select") while TD and $\overline{TD}$ provide the data and its inverse to be set into the flip-flop.

Common control of the transmit circuitry assumes a matrix arrangement of line units, similar to that used for input. A row of the matrix is loaded at one time by pulsing the appropriate row-oriented RS line while the desired data is applied to the column-oriented TD lines. Data for one row of the matrix will previously have been obtained from the processor, and held in a buffer register until the correct instant for transmission.

Transmission of data proceeds on a row-by-row basis, all rows of the matrix being served with data within the duration of one telegraph element. This process, repeated at the required signalling rate, and with all timing under the control of the output equipment, meets the requirements of minimising equipment complexity while removing any critical timing responsibility from the processor.

The types of application for which this equipment is best suited are frequently sufficiently critical to require duplication of the central processor and major peripherals. It is not, however, usual to duplicate the communications lines in the same way. The design of this equipment therefore presents an opportunity to provide the necessary duplication of all common control logic, and to integrate this duplication with the unduplicated lines in a logical way.

It is desirable, therefore, to establish the following two principals as design guides for duplication:

1. Input is such that all traffic is offered to both processors at all times — no switching is involved. Output is switched in such a way that no type of fault in the off-line processor or communications control logic can allow transmission to line from this system.

2. No single fault may cause a failure of more than one telegraph line that cannot be recovered by switching to the standby system.

Applying these principles to the input equipment shows that duplication must begin in the line units, by providing duplication of FF, gates G1, G2 and G3 (FIG. 3), and the two differentiators. All common logic, shown on FIGS. 4 and 5 must also be duplicated.

The duplication provisions for output are shown on FIG. 8. The line driver and associated flip-flop LF are not duplicated, but the loading gates are duplicated and provided with additional inputs, TEA and TEB, used to switch between one system and the other. These signals are provided from a switch, and one is the inverse of the other.

As with the input equipment, all common control equipment for output can be duplicated.

What I claim is:

1. A method of interfacing to a computer information transmitted on any one of a plurality of lines, each of said lines being connected to the input of a respective bistable device and each said device being changed from one stable state to the other on the occurrence of a signal transition of its respective line, said method comprising: electrically arranging said bistable devices in a matrix pattern having rows and columns; connecting the output of all of said bistable devices to a common sensing node; detecting at said common sensing node a matrix output signal resulting from a signal transition of any of said lines; initiating in response to detection of a matrix output signal a search process; performing said search process as a progressive binary division by applying selection signals to rows and columns of the matrix and progressively substracting by groups from the number of rows and columns which are receiving selection signals, and continuing to subtract from the remainder of said number if the matrix output signal continues to be detected while reverting to the preceding subtracted group and subtracting progressively therefrom if the matrix output signal ceases to be detected, until only one row and one column of the matrix is receiving respective selection signals, thereby identifying that one of said plurality of lines on which a signal transition has occurred; and transferring to the computer a signal indicative of a signal transition and an identifying address of the line on which the signal transition has occurred.

2. The method of claim 1 including an initial step of applying selection signals comprising logical highs to all rows and columns of said matrix during the quiescent state of all of the lines of said plurality of lines.

3. The method of claim 1 wherein the step of progressive binary division process comprises initially halving all rows and columns of the matrix and thereafter progressively halving the remainder of the rows and columns of said matrix.

4. The method of claim 1 wherein the step of progressive binary division comprises selecting the number of divisions in the search process required to determine the line on which a signal transition has occurred as a function of the number of lines, whereby the search time which will be uniform regardless on which line of the plurality of lines a transition has occurred.

5. The method of claim 1 including the step of controlling said search process by initiating and supervising the application of selection signals to the rows and columns of said matrix and in which the step of transferring to the computer a signal indicative of a signal transition and identifying address includes registering said address.

6. A method of detecting and locating a change of state at a plurality of like occurrence sites, each occurrence site having a location and being connected to a bistable device, each said bistable device having an input, an output and first and second external signal terminals, the occurrence of a change of state at one of said sites causing the bistable device connected thereto to change its state and hence change its output, a gate being connected to the outputs of said bistable devices, said gate providing an output signal in response to a change of output of one of said bistable devices, said method comprising: electrically arranging said bistable devices in a matrix having columns and rows, common connections being made to the first external signal terminals of said bistable devices in respective columns of said matrix; applying a signal to all said first and second external signal terminals; varying the application of the signal to said first and second external signal terminals of said bistable devices in response to an output signal from said gate, so that only a fraction of said bistable devices have a signal applied to both their first and second external signal terminals, whereupon the output from said gate indicates the presence of a device having a changed state in said fraction of devices; and repeating the variation of the application of signals to a reduced number of said bistable devices until the location of the bistable device which has changed state is located.

* * * * *